Dec. 4, 1951    W. L. McGUINNESS    2,577,142
TRACTION PROVIDING DEVICE FOR
AUTOMOBILE TIRES AND THE LIKE
Filed Oct. 7, 1948
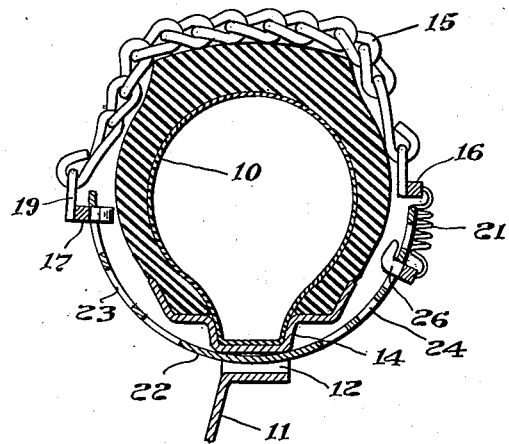
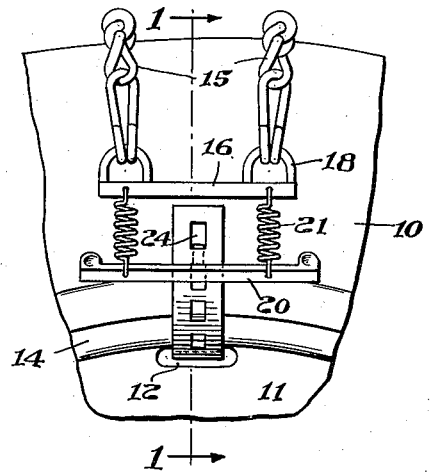
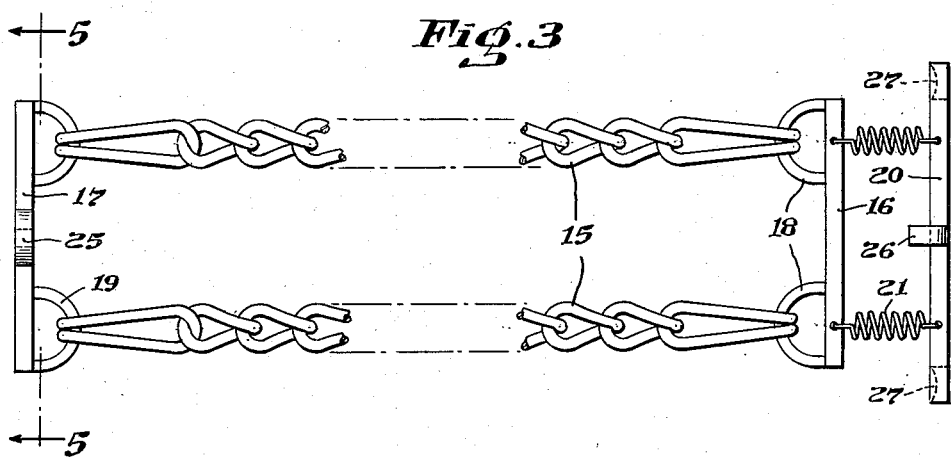
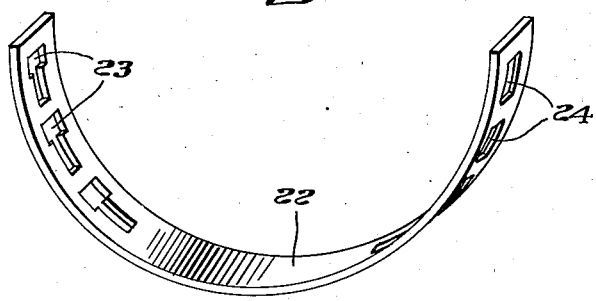
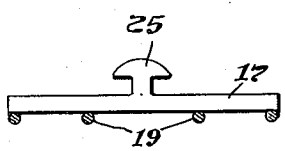
INVENTOR.
Walter L. McGuinness
BY
ATTORNEY Patented Dec. 4, 1951

2,577,142

UNITED STATES PATENT OFFICE 2,577,142

TRACTION PROVIDING DEVICE FOR AUTOMOBILE TIRES AND THE LIKE

Walter L. McGuinness, Waltham, Mass.

Application October 7, 1948, Serial No. 53,228

2 Claims. (Cl. 152—237)

My invention relates to a device particularly adapted for increasing the traction and skid resistance of automobile tires and the like and has for its principal object to provide a device of the indicated character which is suited for application to a tire mounted on the modern disc wheel which affords no open space between the hub and felly except spaced slots around the outer margin of the disc.

At the present time there exists no satisfactory emergency anti-skid device adapted for use on tires mounted on wheels of this type. Accordingly, my invention fulfills a definite and current need.

In my device, the traction providing, anti-skid member, which is preferably, although not necessarily, of metal chain construction, is extended transversely of the tread of the tire. In addition to such member, the device includes a connecting side wall member comprising resilient or elastic elements, preferably springs, which are extensible in the direction of the hub of the wheel, and a resilient felly-straddling support member, most suitably an appropriately shaped band of spring metal. Although one or the other of the road-engaging and side wall members may be fixedly secured to the felly-straddling support, in the preferred construction these members are each provided with one or more hooks or other hasp-like elements whereby the ends of the unit they constitute may be detachably fastened to the felly-straddling member, which, in the preferred construction, is perforated to provide staples for the hooks or the like.

My device is easily and quickly placed on and removed from the tire without the use of tools, special or ordinary, and exhibits no tendency to creep either transversely or circumferentially irrespective of the conditions of use.

A particular and most important feature of the invention resides in the fact that the detachable connections (or connection) are made secure against accidental disengagement on use of the device by the tensioning of both the felly-straddling member and the resilient elements forming part of the side wall member.

My invention will be better understood by the following description which will proceed with reference to the accompanying drawings illustrating the preferred embodiment thereof and in which:

Fig. 1 is a sectional view showing a tire and a part of a wheel, the tire having the device of the invention applied thereto;

Fig. 2 is a view at right angles to Fig. 1;

Fig. 3 is an enlarged plan view of part of the device as laid out on a flat surface, the view not including the felly-straddling member;

Fig. 4 is a perspective view of the felly-straddling member; and

Fig. 5 is a detail view taken on the line 5—5 of Fig. 3.

In Figs. 1 and 2, the tire 10 is shown as mounted on a disc wheel 11 having spaced slots 12 around the margin of the disc.

Across the tire is extended a pair of chains 15, the chains being joined at their ends by cross bars 16 and 17 (see Fig. 3) comprising loops 18 and 19, respectively, to which the ends of the chains are secured. Cross bar 16 is connected to a third cross bar 20 through springs 21 the ends of which are anchored in holes drilled in the cross bars.

Passing through slot 12 and straddling felly 14 is a resilient, essentially U-shaped, metal support band 22 (see Fig. 4) having apertures 23 and 24 therein. Apertures 23 are adapted to receive a knob 25, the shape of which is best seen from Fig. 5, integral with cross bar 17, while apertures 24 receive hook 26 on cross bar 20, the hook being preferably integral with the bar.

It will be observed that to insert the knob 25 into one of the apertures 23 it is necessary to turn the cross bar 17 at right angles to the position of the bar as shown in Figs. 1 and 2. With the bar in the position shown in these figures the knob is effectively locked in the selected aperture.

I ordinarily make the described connection before applying the device to the tire, but it may be made with the chains in place and either before or after the hook 26 has been fastened to the felly band on the other side of the tire.

Finger grooves 27 are provided in bar 20 to facilitate the pulling down of this bar and the tensioning of springs 21 when the device is applied in the preferred manner. In applying the device, I prefer to make the chains as tight as is consistent with reasonable effort. It is particularly important, in order that the advantages of my invention will be fully realized, that the opposed ends of the felly band be drawn slightly toward each other. When the band is so placed in tension, the detachable connections will be made much more secure against accidental disengagement than otherwise. In the manufacture of the device, I fashion the band of a gauge of metal which allows of accomplishment of the tensioning without undue effort.

My device may be materially modified without departing from the spirit and scope of the invention. Thus, in lieu of the two chains disclosed, I may use a single chain or three or more or I may substitute road-engaging members of an entirely different nature than chains, bands carrying rubber lugs, for example. While I consider it best to position the hasp elements on the end cross bars as shown, they may be mounted on the felly band and suitable staples provided on the cross bars.

Numerous additions to the device are also possible. For example, there may be added rubber sleeves for protecting the paint of the wheel or extra chain sections which follow the circumference of the tire, these latter comprising cross chains themselves and being supported by the cross chains shown through suitable connections, permanent or detachable.

I claim:

1. A device for increasing the traction and skid resistance of automobile tires and the like comprising a chain member adapted to be extended across the tread of a tire, a first cross bar attached to one end of said chain member, a second cross bar attached at the other end of said chain member, a plurality of springs, radially extensible with relation to the circumference of the tire, fastened to said second cross bar, a third cross bar attached to and connecting the opposite ends of said springs, a hasp element secured to said third cross bar, a similar element secured to said first cross bar, and a resilient metal band shaped to straddle the felly of the wheel on which the tire is mounted, said band having a series of perforations complementary with respect to the hasp element secured to said third cross bar and a second series of perforations complementary with respect to the hasp element secured to said first cross bar.

2. In an emergency traction device of the type comprising a road-engaging portion adapted to be extended across the tread of a tire, a resilient felly-straddling portion, a first cross bar through which the road-engaging portion is attached at one end of said felly-straddling portion and a pair of cross bars through which said road-engaging portion is attached at the other end of said felly-straddling portion, said pair of cross bars being interconnected by a plurality of elastic elements radially extensible with relation to the circumference of the tire, the attachment thereof to said felly-straddling portion being effected by means including complementary elements associated with said felly-straddling portion and the cross bar of said pair furthest removed from said road-engaging portion.

WALTER L. McGUINNESS.

REFERENCES CITED

The following references are of record in the file of this patent:

UNITED STATES PATENTS

| Number | Name | Date |
|---|---|---|
| 1,928,474 | Bambenek | Sept. 26, 1933 |
| 2,424,940 | Muise | July 29, 1947 |